(12) United States Patent
Fang et al.

(10) Patent No.: US 9,460,407 B2
(45) Date of Patent: Oct. 4, 2016

(54) GENERATING GRAPHICAL REPRESENTATIONS OF DATA

(71) Applicants: Yue Fang, San Jose, CA (US); Yutong Zhao, San Jose, CA (US); David Chambers, San Jose, CA (US); Ankur Jain, Sunnyvale, CA (US); Benjamin Tomsky, San Mateo, CA (US); Pavan Bayyapu, Cupertino, CA (US); Bert Legrand, Menlo Park, CA (US); Bin Duan, Sunnyvale, CA (US)

(72) Inventors: Yue Fang, San Jose, CA (US); Yutong Zhao, San Jose, CA (US); David Chambers, San Jose, CA (US); Ankur Jain, Sunnyvale, CA (US); Benjamin Tomsky, San Mateo, CA (US); Pavan Bayyapu, Cupertino, CA (US); Bert Legrand, Menlo Park, CA (US); Bin Duan, Sunnyvale, CA (US)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 13/887,007

(22) Filed: May 3, 2013

(65) Prior Publication Data
US 2014/0331165 A1 Nov. 6, 2014

(51) Int. Cl.
G06Q 10/06 (2012.01)
G06F 17/21 (2006.01)
G06F 17/30 (2006.01)
G06Q 30/02 (2012.01)

(52) U.S. Cl.
CPC ......... *G06Q 10/0639* (2013.01); *G06F 17/212* (2013.01); *G06F 17/30867* (2013.01); *G06Q 30/0201* (2013.01)

(58) Field of Classification Search
CPC ........... G06F 17/30528; G06F 17/212; G06F 17/30867; G06F 17/5004; G06F 11/008; A63F 13/12
See application file for complete search history.

(56) References Cited

U.S. PATENT DOCUMENTS

| 7,516,135 | B2 | 4/2009 | Bayyapu |
| 7,610,576 | B2 | 10/2009 | Srinivasamurthy et al. |
| 7,627,500 | B2 | 12/2009 | Zhang et al. |
| 7,783,520 | B2 | 8/2010 | Zhang et al. |

(Continued)

OTHER PUBLICATIONS

Fabre et al., Monitoring Manufacturing System Behavior by Continous Discrete-Event Simulation; © 1993; IEEE; 8 pages.*

(Continued)

*Primary Examiner* — Linh K Pham
(74) *Attorney, Agent, or Firm* — Fish & Richardson P.C.

(57) ABSTRACT

Techniques for generating a data-based graphical representation include providing, to a user, a graphical user interface that comprises selectable attribute names; receiving a user selection of a first attribute name; in response to receiving the user selection, invoking a call to a back-end server that comprises a database, the database storing sets of attribute values, each set of attribute values associated with one of the selectable attribute names; receiving, from the back-end server, a response to the invoked call, the response comprising a particular set of attribute values that is associated with the user-selected first attribute name; generating the graphical representation of a relationship between the received attribute values associated with the user-selected first attribute name and a key figure of the attribute values; and preparing the graphical representation for display on the graphical user interface.

17 Claims, 10 Drawing Sheets

(56) References Cited

U.S. PATENT DOCUMENTS

| | | | |
|---|---|---|---|
| 7,814,457 B2 | 10/2010 | Srinivasamurthy et al. | |
| 7,853,931 B2 | 12/2010 | Srinivasamurthy et al. | |
| 7,895,115 B2 | 2/2011 | Bayyapu et al. | |
| 8,095,449 B2 | 1/2012 | Cui et al. | |
| 8,108,399 B2 | 1/2012 | Dumitru et al. | |
| 8,204,880 B2 | 6/2012 | Vignet | |
| 8,392,359 B2 | 3/2013 | O'Donnell et al. | |
| 8,392,380 B2 | 3/2013 | Zhao et al. | |
| 8,635,530 B2 | 1/2014 | Brugler et al. | |
| 8,671,391 B2 | 3/2014 | Schwerk | |
| 8,682,904 B1 | 3/2014 | Weber | |
| 8,725,775 B2 | 5/2014 | Gong et al. | |
| 8,732,213 B2 | 5/2014 | Sowell et al. | |
| 2003/0061243 A1* | 3/2003 | Kim | G06F 17/3061 |
| 2004/0027349 A1* | 2/2004 | Landau | G06F 17/30572 345/440 |
| 2004/0236655 A1* | 11/2004 | Scumniotales | G06Q 10/0637 705/36 R |
| 2005/0102173 A1* | 5/2005 | Barker | G06Q 10/063 705/7.26 |
| 2006/0161901 A1 | 7/2006 | Srinivasamurthy et al. | |
| 2006/0161902 A1 | 7/2006 | Srinivasamurthy et al. | |
| 2007/0100739 A1 | 5/2007 | Cui et al. | |
| 2007/0112664 A1 | 5/2007 | Zhang et al. | |
| 2009/0067739 A1* | 3/2009 | Sekine | H04N 1/603 382/254 |
| 2010/0076960 A1 | 3/2010 | Sarkissian et al. | |
| 2010/0083164 A1* | 4/2010 | Martin | G06F 19/3406 715/781 |
| 2011/0040723 A1 | 2/2011 | O'Donnell et al. | |
| 2012/0011458 A1 | 1/2012 | Xia et al. | |
| 2012/0041990 A1 | 2/2012 | Kreindlina et al. | |
| 2012/0102543 A1* | 4/2012 | Kohli | H04L 63/20 726/1 |
| 2012/0198369 A1 | 8/2012 | Sorin et al. | |
| 2012/0254783 A1* | 10/2012 | Pourshahid | G06F 3/04883 715/771 |
| 2012/0290487 A1* | 11/2012 | Lee | G06Q 50/184 705/310 |
| 2012/0331036 A1 | 12/2012 | Duan et al. | |
| 2013/0009963 A1* | 1/2013 | Albrecht | G06T 13/80 345/473 |
| 2013/0111321 A1* | 5/2013 | Dorrell | 715/215 |
| 2013/0204702 A1* | 8/2013 | Nishida | G06Q 30/02 705/14.54 |
| 2013/0254155 A1* | 9/2013 | Thollot | G06F 17/30528 707/602 |
| 2013/0332862 A1* | 12/2013 | Mirra | G06Q 40/06 715/760 |
| 2013/0339255 A1* | 12/2013 | Talbird | G06Q 50/16 705/306 |
| 2013/0339514 A1* | 12/2013 | Crank | H04L 63/1408 709/224 |
| 2014/0040805 A1* | 2/2014 | Brereton | G06Q 10/10 715/771 |
| 2014/0053091 A1* | 2/2014 | Hou | G06F 17/30389 715/769 |
| 2014/0075390 A1* | 3/2014 | Gauthier | G06Q 10/0631 715/840 |
| 2014/0095537 A1* | 4/2014 | Park | G06F 17/30442 707/770 |
| 2014/0095541 A1* | 4/2014 | Herwadkar | G06F 17/30457 707/774 |
| 2014/0114867 A1* | 4/2014 | Volkmann | G06Q 10/06 705/308 |
| 2014/0141462 A1* | 5/2014 | Perree | G06F 19/709 435/29 |
| 2014/0152667 A1* | 6/2014 | Li | G06T 1/00 345/440 |
| 2014/0181085 A1* | 6/2014 | Gokhale | G06F 17/30554 707/722 |
| 2014/0278826 A1* | 9/2014 | Miller | G06Q 10/06398 705/7.39 |

OTHER PUBLICATIONS

Smith et al., Mapping Forest Types Using Multi-Sensor Remote Sensing Method, © 2008, IEEE; 4 pages.*

Veloso et al., Geo Visualisation of SAPO Search Activity; © 2010, IEEE; 6 pages.*

SAP BusinessObjects Explorer, Search and explode your business data-anytime, anywhere-with SAP Business Objects Explorer. 1 page. Retrieved May 3, 2013 from URL: http://www54.sap.com/pc/analytics/business-intelligence/software/explorer/index.html.

* cited by examiner

GENERATING GRAPHICAL REPRESENTATIONS OF DATA

TECHNICAL BACKGROUND

This disclosure relates to generating graphical representations of data and, more particularly, generating graphical representations of on-demand data.

BACKGROUND

As a visual representation of data, charts are an important component of analytics, and many modern applications have the need to not only display a chart, but also allows the users to create and edit the chart. Additionally, as more users are becoming mobile, e.g., employing mobile devices to conduct business, considerations of creating and editing the chart in view of a mobile platform should be considered.

SUMMARY

The present disclosure relates to computer-implemented methods, software, and systems for generating a data-based graphical representation. In some implementations, a graphical user interface (GUI) is provided to a user. The GUI includes selectable attribute names. Each attribute name includes a metric that is associated with a portion of data. A user selection is received of a first attribute name of the selectable attribute names. In response to receiving the user selection of the first attribute name, a call to a back-end server is invoked. The back-end server includes a database that stores sets of attribute values. Each set of attribute values is associated with one of the selectable attribute names. A response to the invoked call is received from the back-end server. The response includes a particular set of attribute values that is associated with the user-selected first attribute name. The graphical representation is generated of a relationship between the received attribute values associated with the user-selected first attribute name and a key figure of the attribute values. The key figure includes a statistical value associated with each of the received attribute values. The graphical representation is prepared for display on the graphical user interface.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general implementations includes, wherein the response includes only the particular set of attribute values that is associated with the user-selected first attribute name.

A second aspect combinable with any of the previous aspects includes displaying, to the user, the graphical user interface that further includes selectable data sources, the selectable data sources include an attribute data source; receiving a user selection of the attribute data source; and in response to receiving the user selection of the attribute data source, providing, to the user, the graphical user interface that includes the selectable attribute names.

A third aspect combinable with any of the previous aspects includes the graphical representation including a bar chart, with an x-axis of the bar chart associated with the received attribute values and the y-axis of the bar chart associated with the key figure.

A fourth aspect combinable with any of the previous aspects includes receiving a user selection of one or more of the received attribute values; filtering the received attribute values to provide a subset of attribute values, the subset of attribute values includes the selected attribute values; and generating the graphical representation of the relationship between the subset of attribute values and the key figure of the subset of attribute values.

A fifth aspect combinable with any of the previous aspects includes, in response to receiving the user selection of the first attribute name, grouping the key figures of the attribute values based on the user-selected first attribute name.

A sixth aspect combinable with any of the previous aspects includes receiving a user selection of a second attribute name of the selectable attribute names; in response to receiving the user selection of the second attribute name, invoking an additional call to the back-end server; receiving, from the back-end server, an additional response to the additional invoked call, the additional response including only a particular set of attribute values that is associated with the user-selected second attribute name; receiving a user selection of a received attribute value that is associated with the user-selected second attribute name; filtering the received attribute values that are associated with the user-selected first attribute name to provide a subset of attribute values that are associated with the user-selected first attribute name; and generating the graphical representation of the relationship between the subset of the attribute values that are associated with the user-selected first attribute name and the key figure of the subset of the attribute values that are associated with the user-selected first attribute name.

A seventh aspect combinable with any of the previous aspects includes wherein the graphical representation is a bar chart, with an x-axis of the bar chart associated with the subset of the attribute values that are associated with the user-selected first attribute and the y-axis of the bar chart associated with the key figure.

Various implementations of a computing system according to the present disclosure may have one or more of the following features. For example, increased performance for loading chart-based data is obtained and loading time of the chart-based data is reduced. In addition, through progressively loading chart-related metadata, such as attribute values, based on user selection, user's screen will not be immediately occupied by large chunk of data at the very beginning, thus avoiding unnecessary usage of screen real estate.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
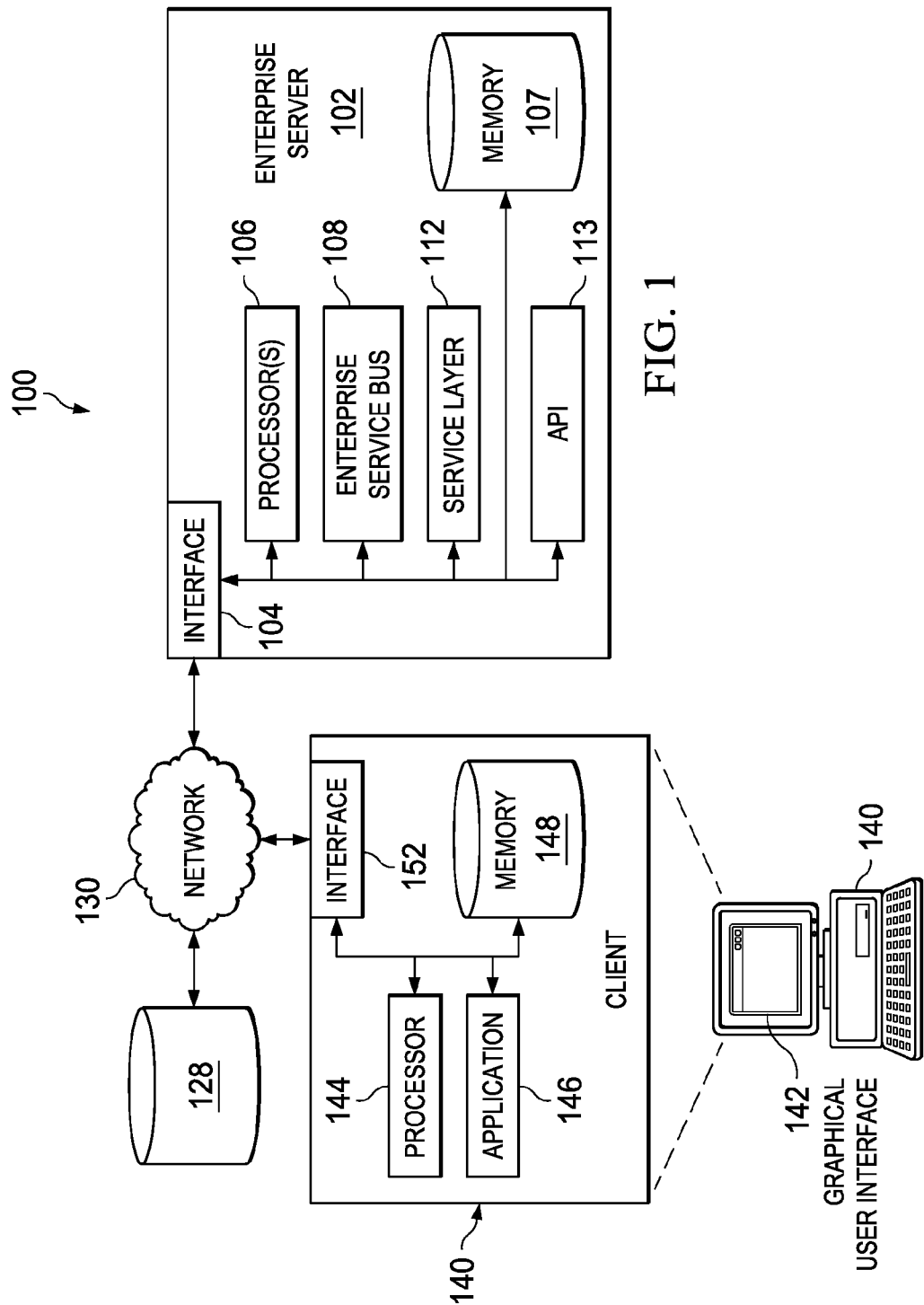
FIG. 1 illustrates an example distributed computing system for generating graphical representations of data.

FIG. 1 illustrates an example distributed computing system 100 for generating a data-based graphical representation. In some implementations, a graphical user interface (GUI) is provided to a user. The GUI includes selectable attribute names. Each attribute name includes a metric that is associated with a portion of data. A user selection is received of a first attribute name of the selectable attribute names. In response to receiving the user selection of the first attribute name, a call to a back-end server is invoked. The back-end server includes a database that stores sets of attribute values. Each set of attribute values is associated with one of the selectable attribute names. A response to the invoked call is received from the back-end server. The response includes a particular set of attribute values that is associated with the user-selected first attribute name. The graphical representation is generated of a relationship between the received attribute values associated with the user-selected first attribute name and a key figure of the attribute values. The key figure includes a statistical value associated with each of the received attribute values. The graphical representation is prepared for display on the graphical user interface.

In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed via the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. For example, in one implementation, the client computing system 140 can utilize the service layer 112 to communicate with the design engine 118. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between the design engine 118 and one or more components of the enterprise server computing system 102 or other components of the example distributed computing system 100, both hardware and software. For example, in some implementations, the design engine 118 can utilize the API 113 to communicate with the client computing system 140. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (i.e., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2A:
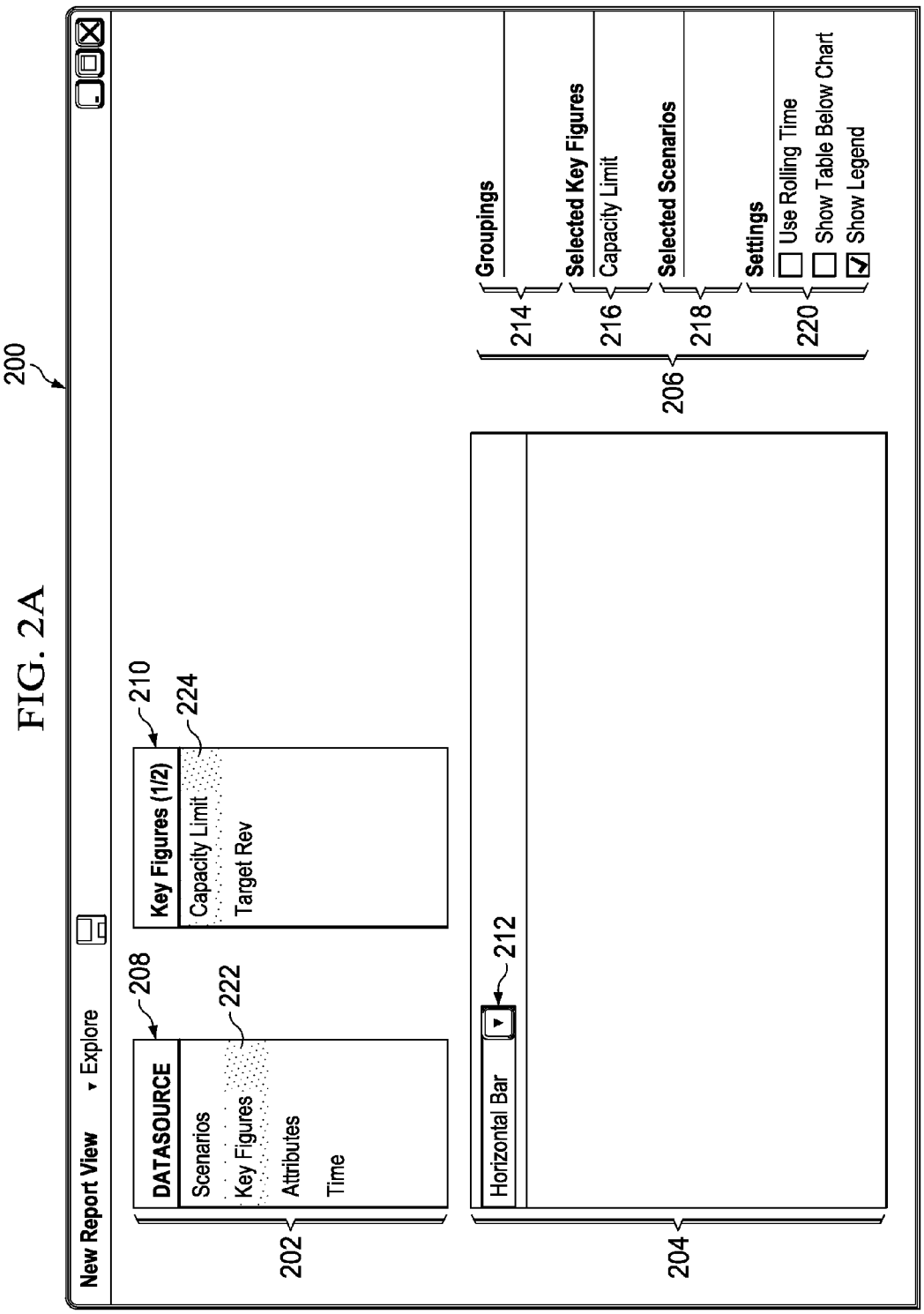
FIGS. 2A-2F are example graphical user interfaces for generating graphical representations of data.
Figure 2B:
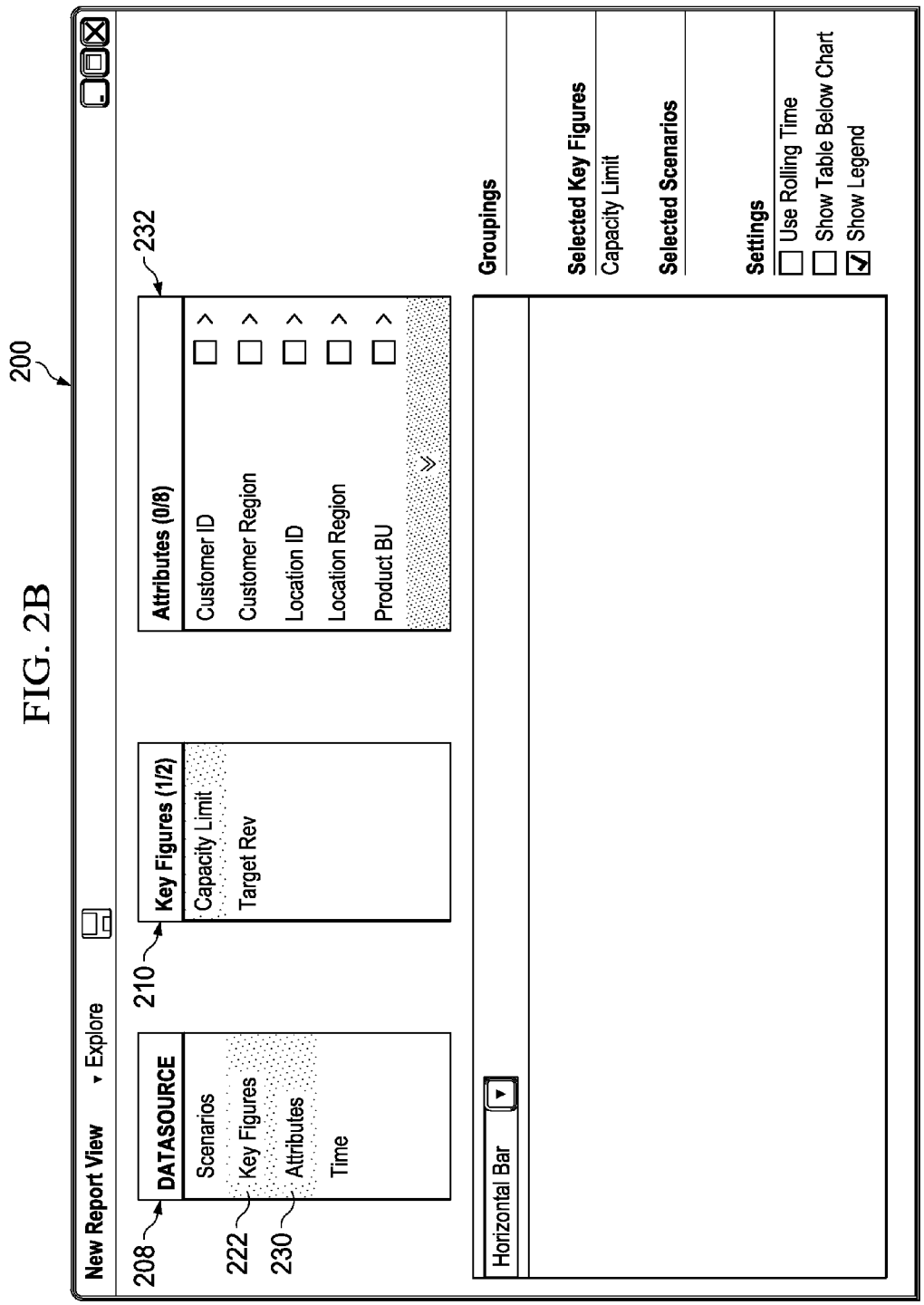
Figure 2C:
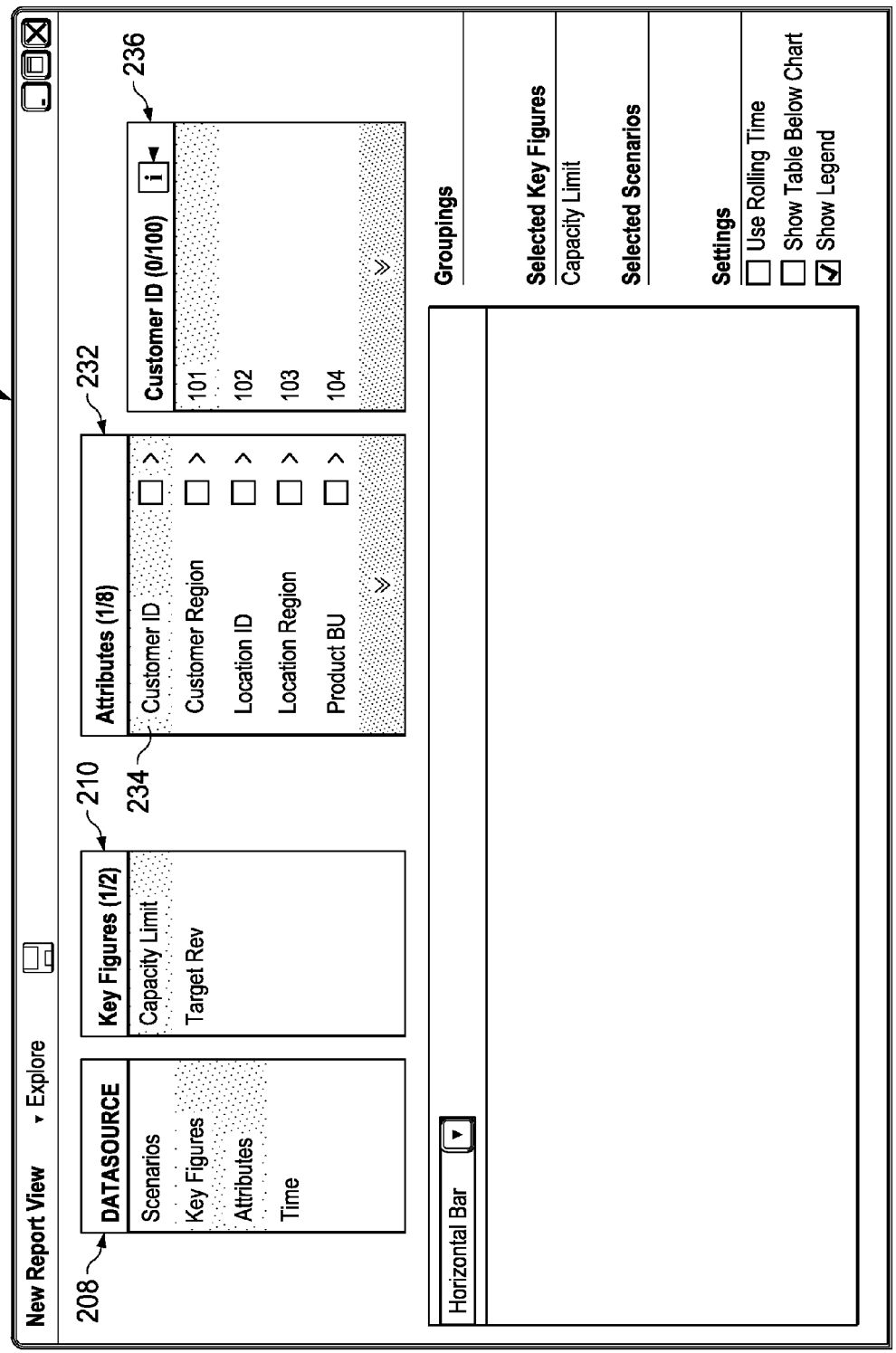
Figure 2D:
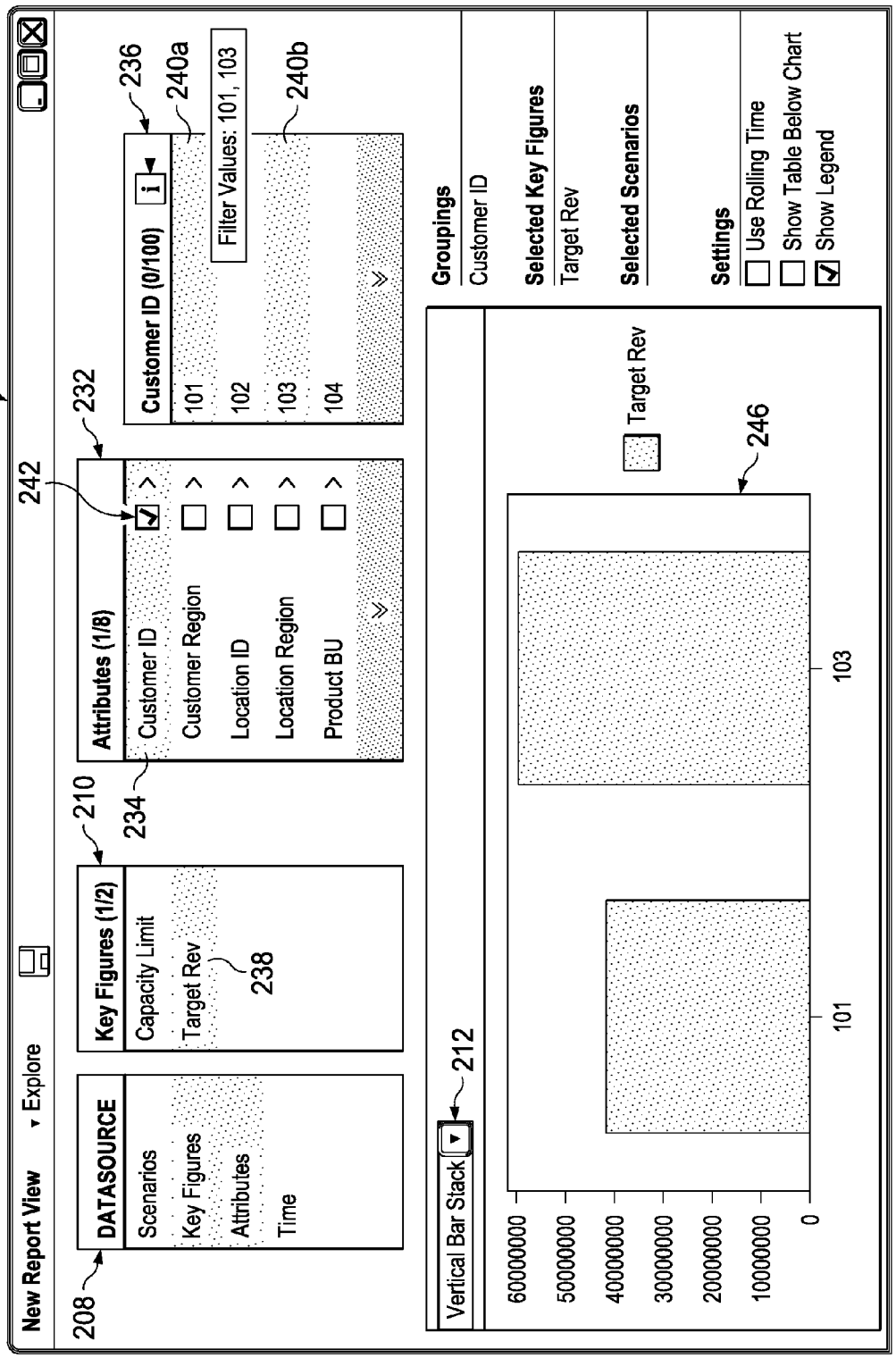

FIGS. 2A-2F are example graphical user interfaces for generating graphical representations of data. In some examples, the data is received on-demand, that is, the data is received in response to user input that is associated with a request for such data. For example, a graphical user interface (GUI) is provided to a user that includes selectable attribute names, as illustrated in FIG. 2B. A user selection of a first attribute name is received, and in response, a call to a back-end server is invoked such that a response is received including attribute values associated with the first attribute name, as illustrated in FIG. 2C. A graphical representation is generated based on the attribute values and a key figure associated with the attribute values, as illustrated in FIG. 2D.

Specifically, FIG. 2A depicts a graphical user interface (GUI) 200 that is provided to a user. For example, the user can be associated with the client computing system 140, and the client computing system 140 can include the GUI 200, similar to that of GUI 142. The GUI 200 includes a selection portion 202, a display portion 204, and a summary portion 206.

The selection portion 202 includes selectable, e.g., user-interactive, interface elements. For example, the user can provide input to the interface elements of the selection portion 202 to facilitate generation of the graphical representation, described further below. In some examples, the selection portion 202 includes a selectable data source interface element 208. The selectable data source interface element 208 includes categorized data that is associated with a graphical representation. For example, the selectable data sources of the selectable data source interface element 208 include a scenarios data source, an attribute data source, a time data source, and a key figures data source 222.

In response to a user selection of the key figures data source 222 of the selectable data sources interface element 208, the selection portion 202 is updated to include a selectable key figures interface element 210. In some examples, the selectable data source interface element 208 is updated to depict selection of the key figures data source 222. For example, the key figures data source 222, e.g., the graphical representation of the key figures data source 222, can be highlighted, bolded, or otherwise graphically distinct from the remaining data sources of the data source interface element 208.

In some examples, a key figure, e.g., of the key figures data source 222, includes a statistical value associated with an attribute value. In other words, a key figure includes a measure of a particular property of an entity, e.g., the attribute value. For example, the key figures data source 222 includes a capacity limit key FIG. 224 and a target revenue key figure. In some examples, the key figures interface element 210 is updated to depict selection of the capacity limit key FIG. 224. For example, the capacity limit key FIG. 224, e.g., the graphical representation of the capacity limit key FIG. 224, can be highlighted, bolded, or otherwise graphically distinct from the remaining key figures of the key figures data source 222.

The display portion 204 illustrates a relationship between data elements, e.g., a chart, described further below. The display portion 204 includes a graph type selection 212. For example, a list of one or more types of charts can be provided, and selected by the user. The summary portion 206 includes a summary of data that is selected by the user within the selection portion 202 and/or displayed by the display portion 204. For example, the summary portion 206 includes a groupings portion 214, a selected key figures portion 216, a selected scenarios portion 218, and a setting portion 220. For example, the key figures portion 216 is based on a summary of the key figures selected by the user within the key figures interface element 210, e.g., the capacity limit key FIG. 224.

FIG. 2B illustrates an updated GUI 200 after a user selection of an attributes data source 230 of the selectable data source interface element 208. Specifically, the user can select one or more of the data sources from the selectable data source interface element 208, e.g., the key figures data source 222 and the attributes data source 230. In some examples, the selectable data source interface element 208 is updated to depict selection of the attributes data source 230. For example, the attributes data source 230, e.g., the graphical representation of the attributes data source 230, can be highlighted, bolded, or otherwise graphically distinct from the remaining, unselected data sources of the data source interface element 208.

In response to receiving the user selection of the attributes data source 230, e.g., received by the client computing system 140, the selection portion 202 is updated to include a selectable attribute names interface element 232. The attribute names interface element 232 includes attribute names that are associated with the attributes data source 230. In some examples, each attribute name of the attribute names interface element 232 comprises a metric that is associated with a portion of data. For example, the attribute names interface element 232 includes eight selectable attribute names, including a customer ID attribute name, a customer region attribute name, a location ID attribute name, a location region attribute name, and a product BU attribute name. The remaining attribute names are obtainable for display by providing a scrolling user input to the attribute names interface element 232.

In some implementations, the GUI 200 includes only the selectable attribute names of the attribute names interface element 232. That is, in response to receiving the user selection of the attribute data source 230, the client computing system 140 only receives the attribute names that are associated with the attributes data source 230 from a back-end server, e.g., the enterprise server computing system 102. Furthermore, the client computing system 140 does not receive any further data, e.g., attribute values, that are associated with the attribute names of the attribute names interface element 232 in response to receiving the user selection of the attribute data source 230.

FIG. 2C illustrates an updated GUI 200 after a user selection of a customer ID attribute name 234 of the selectable attribute names. Specifically, the user can select one or more of the attribute names from the selectable attribute names interface element 232, e.g., the customer ID attribute name 234. In some examples, the selectable attribute names interface element 232 is updated to depict selection of the customer ID attribute name 234. For example, the customer ID attribute name 234, e.g., the graphical representation of the customer ID attribute name 234, can be highlighted, bolded, or otherwise graphically distinct from the remaining, unselected attribute names of the selectable attribute names interface element 232.

In response to receiving the user selection of the customer ID attribute name 234, e.g., received by the client computing system 140, a call is invoked to a back-end server, e.g., the enterprise server computing system 102, that comprises a database, e.g., the memory 107 and/or the repository 128. For example, the call can include a request for attribute values associated with the customer ID attribute name 234. The client computing system 140 can transmit the call to the enterprise computing system 102 over the network 130. In some examples, metadata of the call can be updated to be associated with the customer ID attribute name 234, or otherwise associated, e.g., "tagged." In some implementations, the call includes only a request for attribute values associated with the customer ID attribute name 234. That is, the call does not include a request for attribute values associated with unselected attribute names, or other data associated with the unselected attribute names.

To that end, the database stores, or provides access to, sets of attribute values. Particularly, for example, the database stores a table that includes associations between the attribute names, e.g., of the selectable attribute names interface element 232, and attribute values for each of the attribute names. In some examples, each set of attribute values is associated with one of the selectable attribute names of the selectable attribute names interface element 232. In some examples, each set of attribute values is associated with only one of the selectable attribute names of the selectable attribute names interface element 232.

A response from the back-end server, e.g., the enterprise server computing system 102, to the invoked call is received, e.g., by the client computing system 140. For example, the enterprise server computing system 102 communicates the response to the client computing system 140 over the network 130. The response includes a particular set of attribute values that is associated with the user-selected attribute name, e.g., the customer ID attribute name 234. For example, the response includes the customer ID attribute values that are associated with the customer ID attribute name 234. The customer ID attribute values can include customer IDs, e.g., 101, 102, 103, . . . , n.

In some implementations, the response includes only the particular set of attribute values that is associated with the user-selected attribute name, e.g., the customer ID attribute name 234. That is, the response does not include attribute values associated with unselected attribute names, or other data associated with the unselected attribute names.

In some examples, the invoked call and the response to the invoked call are performed by the client computing system 140 and the enterprise server computing system 102 only in response to user input. That is, calls that are not in response to a user input are not performed. By doing so, resources, e.g., computational resources, associated with performing such calls and responses are minimized, e.g., "round trips" of data communication is minimized. For example, resource bandwidth is reduced, or minimized, by 1) only performing a call in response to an appropriate user input, e.g., the user selection of the customer ID attribute name 234 and 2) by returning only attribute values that are associated with the user selection of the customer ID attribute name 234, e.g., the attribute values. Thus, unnecessary calls associated with unselected attribute names are avoided, thus minimizing resource expense, and further, only attribute values associated with a user-selected attribute name are provided in a response to the call. For example, the call associated with user selection of the customer ID attribute name 234 is only invoked after user-selection of the same and further only attribute values associated with the customer ID attribute name 234 are provided in a response to the call. In some examples, resource expenses can include processing resources of the client computing system 140, the server computing system 102, or both; and bandwidth associated with the network 130. In some examples, the attribute values are provided to the client computing system 140 "on-demand."

Additionally, in response to receiving the response from the back-end server, the selection portion 202 is updated to include a customer ID interface element 236. The customer ID interface element 236 includes customer ID attribute values that are associated with the customer ID attribute name 234. For example, the customer ID interface element 236 includes one hundred selectable attribute values, e.g., customer IDs, e.g., 101, 102, 103, . . . , n. The remaining, un-displayed attribute values are obtainable for display by providing a scrolling user input to customer ID interface element 236.

FIG. 2D illustrates an updated GUI 200 after user selection of attribute values 240a, 240b. Specifically, the user can select or more of the received attribute values from the customer ID interface element 236, e.g., the attribute values 240a, 240b. In some examples, the customer ID interface element 236 is updated to depict selection of the attribute values 240a, 240b. For example, the attribute values 240a, 240b, e.g., the graphical representation of the attribute values 240a, 240b, can be highlighted, bolded, or otherwise graphically distinct form the remaining, unselected attribute values of the customer ID interface element 236.

Additionally, the GUI 200 is further updated such that the display portion 204 includes a graphical representation 246, e.g., a chart. In some implementations, the graphical representation 246 illustrates a relationship between the attribute values associated with the selected attribute name, e.g., the customer ID attribute name 234, and a key figure of the attribute values, e.g., the selected target revenue key figure 238. For example, the target revenue key figure 238 is a statistical value, e.g., a target revenue, that is associated with the attribute values, e.g., customer IDs that are associated with the customer ID attribute name 234.

In some implementations, in response to selecting the attribute values 240a, 240b, the received attribute values associated with the customer ID attribute name 234 are filtered to provide a subset of attribute values. That is, the attribute values, e.g., the customer IDs 101, 102, 103, . . . , n, are filtered such that the subset of attribute values includes only the selected attribute values 240a, 240b.

To that end, the graphical representation 246 can be generated to illustrate the relationship between the subset of the attribute values associated with the selected attribute name, e.g., the attribute values 240a, 240b, and the key figure associated with the subset of the attribute values, e.g., the attribute values 240a, 240b. For example, the graphical representation 246 includes a vertical bar chart depicting the target revenue key figures 238 for the attribute values 240a, 240b.

In some implementations, the graphical representation 246 is a vertical or a horizontal bar chart. In some examples, the bar chart includes a x-axis and a y-axis, with the x-axis of the bar chart associated with the received attribute values, e.g., the attribute values associated with the customer ID attribute name 234, and the y-axis of the bar chart associated with the selected key figure. For example, the x-axis of the graphical representation 246 is associated with the attribute values 240a, 240b, and the y-axis of the graphical representation 246 is associated with the target revenue key figure 238.

In some implementations, the user can further provide additional user input regarding grouping of the key figures. Specifically, the user can select one of the attribute names of the attribute names interface element 232. In some examples, the attribute names interface element 232 further includes selection boxes adjacent each of the attribute names. For example, the customer ID attribute name 234 is associated with a selection box 242. When the selection box 242 is selected, e.g., the user selects the selection box 242 by "checking" the box, the key figures of the attribute values associated with the customer ID attribute name 234 are grouped by the customer ID attribute name 234.

In response to the user selection of the selection box 242, the values of the key figure of the attribute values, e.g., the selected target revenue key figure 238, are grouped by the customer ID attribute name 234. That is, for the graphical representation 246 including the vertical bar chart, the x-axis is associated with the customer ID attribute name 234. For example, the x-axis includes the attribute values 240a, 240b of "101" and "103" that are associated with the customer ID attribute name 234.

The graphical representation 246 is prepared, e.g., by the client computing system 140, for display on the GUI, e.g., the GUI 142.

Figure 2E:
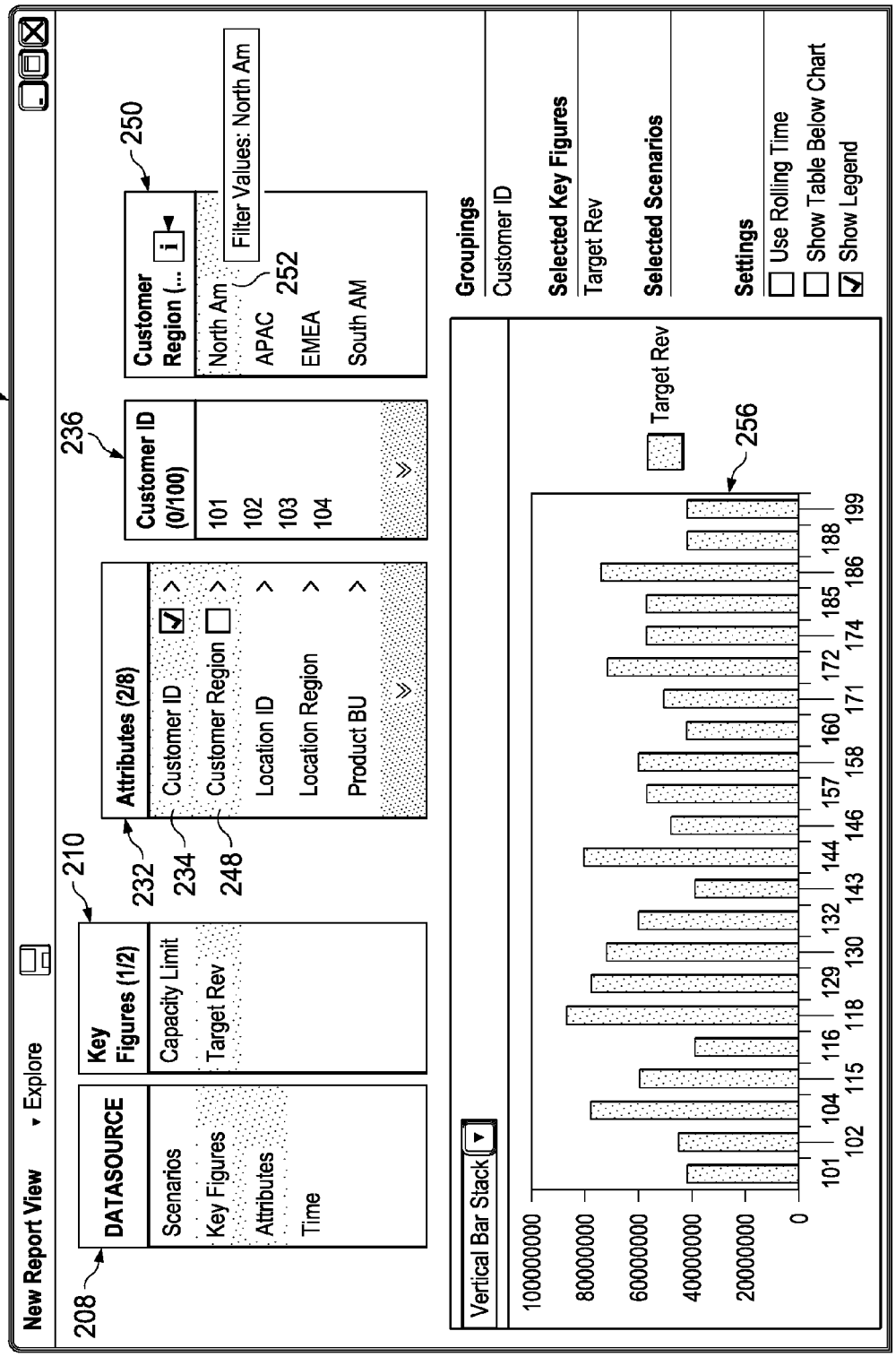

FIG. 2E illustrates an updated GUI 200 with the received attribute values filtered by an additional attribute name. Specifically, a user selection is received of the customer region attribute name 248 of the selectable attribute names interface element 232, that is, an additional attribute name that differs from the previously selected attribute name, e.g., the customer ID attribute name 234. In some examples, the selectable attribute names interface element 232 is updated to depict selection of the customer region attribute name 248. For example, the customer region attribute name 248, e.g., the graphical representation of the customer region attribute name 248, can be highlighted, bolded, or otherwise graphically distinct from the remaining, unselected data attribute names.

In response to receiving the user selection of the customer region attribute name 248, e.g., received by the client computing system 140, an additional call is invoked to the back-end server, e.g., the enterprise server computing system 102. For example, the additional call can include a request for attribute values associated with the customer region attribute name 248, described further below. The client computing system 140 can transmit the additional call to the enterprise computing system 102 over the network 130. In some examples, metadata of the additional call can be updated to be associated with the customer region attribute name 248, or otherwise associated, e.g., "tagged." In some implementations, the additional call includes only a request for attribute values associated with the customer region attribute name 248. That is, the additional call does not include a request for attribute values associated with unselected attribute names, or other data associated with the unselected attribute names. Furthermore, the call does not include a request for attribute values associated with other selected attribute names, e.g., the customer ID attribute name 234.

An additional response from the back-end server, e.g., the enterprise server computing system 102, to the additional invoked call is received, e.g., by the client computing system 140. For example, the enterprise server computing system 102 communicates the additional response to the client computing system 140 over the network 130. The additional response includes a particular set of attribute values that is associated with the user-selected attribute name, e.g., the customer region attribute name 248.

In some implementations, the additional response includes only the particular set of attribute values that is associated with the user-selected attribute name, e.g., the customer region attribute name 248. That is, the additional response does not include attribute values associated with unselected attribute names, or other data associated with the unselected attribute names. Furthermore, the additional response does not include attribute values associated with other selected attribute names, e.g., the customer ID attribute name 234.

Additionally, in response to receiving the response from the back-end server, the selection portion 202 is updated to include a customer region interface element 250. The customer region interface element 250 includes customer region attribute values that are associated with the customer region attribute name 248. For example, the customer region attribute values can include customer regions, e.g., "North Am," "APAC," "EMEA," and "South Am."

The user can select or more of the received attribute values from the customer region interface element 250, e.g., the attribute value 252. In some examples, the customer region interface element 250 is updated to depict selection of the attribute value 252. For example, the attribute value 252, e.g., the graphical representation of the attribute value 252 can be highlighted, bolded, or otherwise graphically distinct form the remaining, unselected attribute values of the customer region interface element 250.

In some implementations, in response to selecting the attribute value 252, the received attribute values associated with the customer ID attribute name 234 are filtered to provide a subset of attribute values. For example, the attribute values, e.g., the customer IDs 101, 102, 103, . . . , n, are filtered in view of the selected attribute value 252. That is, the customer IDs are filtered to include customer IDs that are associated with the attribute value 252, that is, the "North Am" customer region.

Additionally, the GUI 200 is further updated such that the display portion 204 includes a graphical representation 256, e.g., a chart. In some implementations, the graphical representation 256 illustrates a relationship between the subset of the attribute values associated with the customer ID attribute name 234 that are filtered in view of the attribute value 252 and a key figure of the attribute values associated with the customer ID attribute name 234 that are filtered in view of the attribute value 252, e.g., the selected target revenue key figure 238.

In some implementations, when the graphical representation 256 is a chart, the x-axis of the bar chart is associated with the received attribute values, e.g., the attribute values associated with the customer ID attribute name 234, and the y-axis of the bar chart is associated with the selected key figure. For example, the x-axis of the graphical representation 256 is associated with the attribute values that are filtered in view of the attribute value 252, and the y-axis of the graphical representation 256 is associated with the target revenue key figure 238.

Figure 2F:
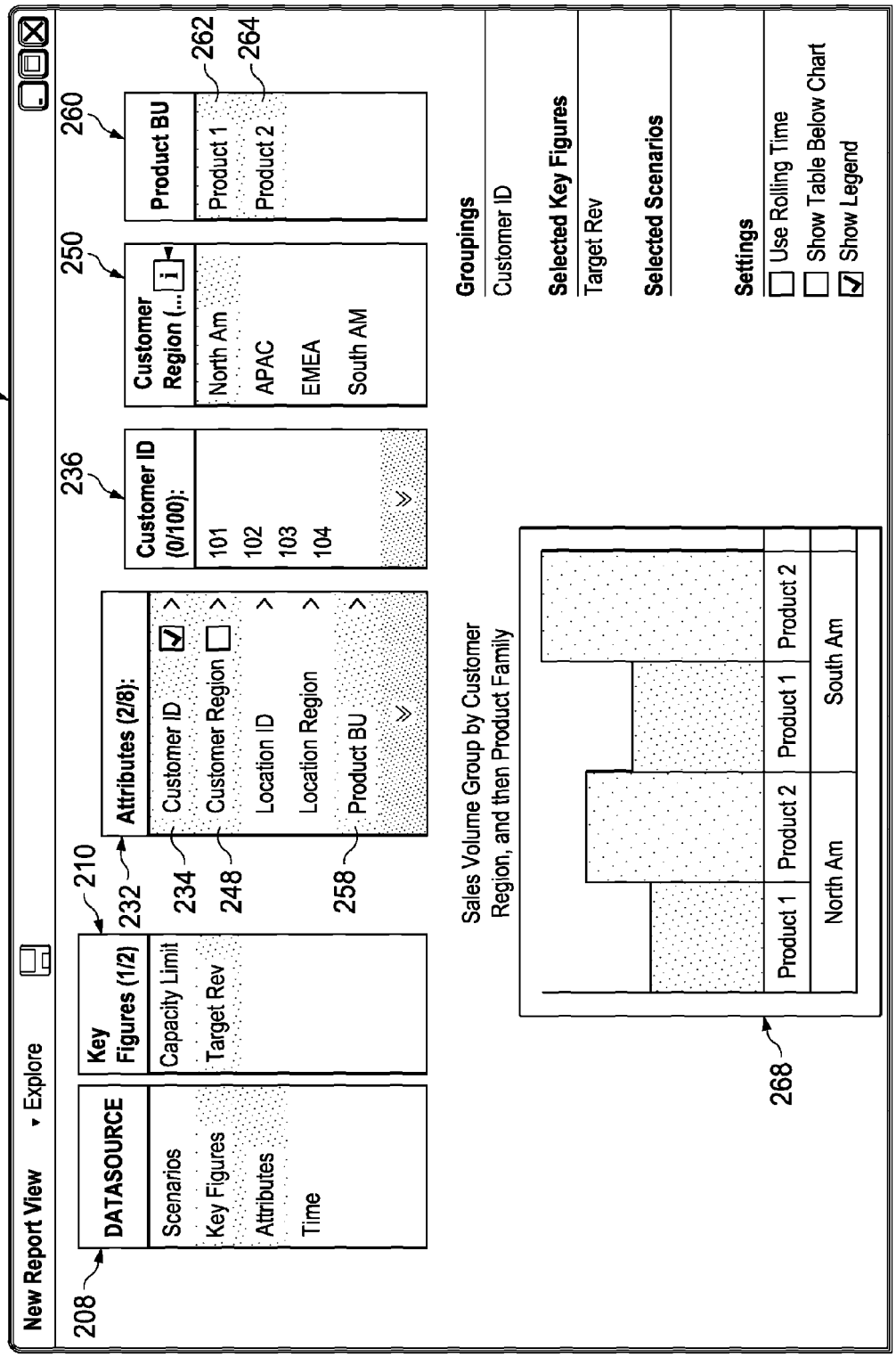

FIG. 2F illustrates GUI 200 with the received attribute values filtered by two attribute names. Specifically, a user selection is received of the product BU attribute name 258 of the selectable attribute name interface element 232 in addition to the selections of the customer ID attribute name 234 and the customer region attribute name 248, mentioned above. In some examples, the attribute name interface element 232 is updated to depict selection of the product BU attribute name 258. For example, the product BU attribute name 258, e.g., the graphical representation of the product BU attribute name 258, can be highlighted, bolded, or otherwise graphically distinct from the remaining, unselected data attribute names.

In response to receiving the user selection of the product BU attribute name 258, e.g., received by the client computing system 140, a further call is invoked to a back-end server, e.g., the enterprise server computing system 102. For example, the further call can include a request for attribute values associated with the product BU attribute name 258, described further below. The client computing system 140 can transmit the further call to the enterprise computing system 102 over the network 130. In some examples, metadata of the call can be updated to be associated with the product BU attribute name 258, or otherwise associated, e.g., "tagged." In some implementations, the further call includes only a request for attribute values associated with the product BU attribute name 258. That is, the call does not include a request for attribute values associated with unselected attribute names, or other data associated with the unselected attribute names. Furthermore, the call does not include a request for attribute values associated with other selected attribute names, e.g., the customer ID attribute name 234 or the customer region attribute name 248.

A further response from the back-end server, e.g., the enterprise server computing system 102, to the further invoked call is received, e.g., by the client computing system 140. For example, the enterprise server computing system 102 communicates the further response to the client computing system 140 over the network 130. The further response includes a particular set of attribute values that is associated with the user-selected attribute name, e.g., the product BU attribute name 258.

In some implementations, the further response includes only the particular set of attribute values that is associated with the user-selected attribute name, e.g., the product BU attribute name 258. That is, the further response does not include attribute values associated with unselected attribute names, or other data associated with the unselected attribute names. Furthermore, the further response does not include attribute values associated with other selected attribute names, e.g., the customer ID attribute name 234, or the customer region attribute name 248.

Additionally, in response to receiving the response from the back-end server, the selection portion 202 is updated to include a product BU interface element 260. The product BU interface element 260 includes product BU attribute values that are associated with the product BU attribute name 258. For example, the product BU attribute values can include product names, e.g., "product 1" and "product 2."

The user can select or more of the received attribute values from the product BU interface element 260, e.g., the attribute value 262, 264. In some examples, the product BU interface element 260 is updated to depict selection of the attribute values 262, 264. For example, the attribute values 262, 264, e.g., the graphical representation of the attribute values 262, 264, can be highlighted, bolded, or otherwise graphically distinct form the remaining, unselected attribute values of the product BU interface element 260.

In some implementations, in response to selecting the attribute value 262, 264, the received attribute values associated with the customer ID attribute name 234 are filtered to provide a subset of attribute values. That is, the attribute values, e.g., the customer IDs 101, 102, 103, . . . , n, are filtered in view of the selected attribute value 250, 266, e.g., "North Am" and "South Am;" and further are filtered in view of the selected attribute values 262, 264, e.g., "product 1" and "product 1." That is, the customer IDs are filtered to include customer IDs that are associated with the attribute values 250, 266, that is, the "North Am" and "South Am" customer regions; and further filtered to include customer IDs that are also associated with the attribute values 262, 264, that is, "product 1" and "product 2."

Additionally, the GUI 200 is further updated such that the display portion 204 includes a graphical representation 268, e.g., a chart. In some implementations, the graphical representation 268 illustrates a relationship between the subset of the attribute values associated with the customer ID attribute name 234 that are filtered to in view of the attribute values 250, 262, 264, 266 and a key figure of the attribute values associated with the customer ID attribute name 234 that are filtered to in view of the attribute value 250, 262, 264, 266, e.g., the selected target revenue key figure 238.

In some implementations, when the graphical representation 268 is a chart, the x-axis of the bar chart is associated with the received attribute values, e.g., the attribute values associated with the customer attribute name 234, and the y-axis of the bar chart is associated with the selected key figure. For example, the x-axis of the graphical representation 268 is associated with the attribute values that are filtered in view of the attribute values 250, 262, 264, 266 and the y-axis of the graphical representation 268 is associated with the target revenue key figure 238.

Figure 3:
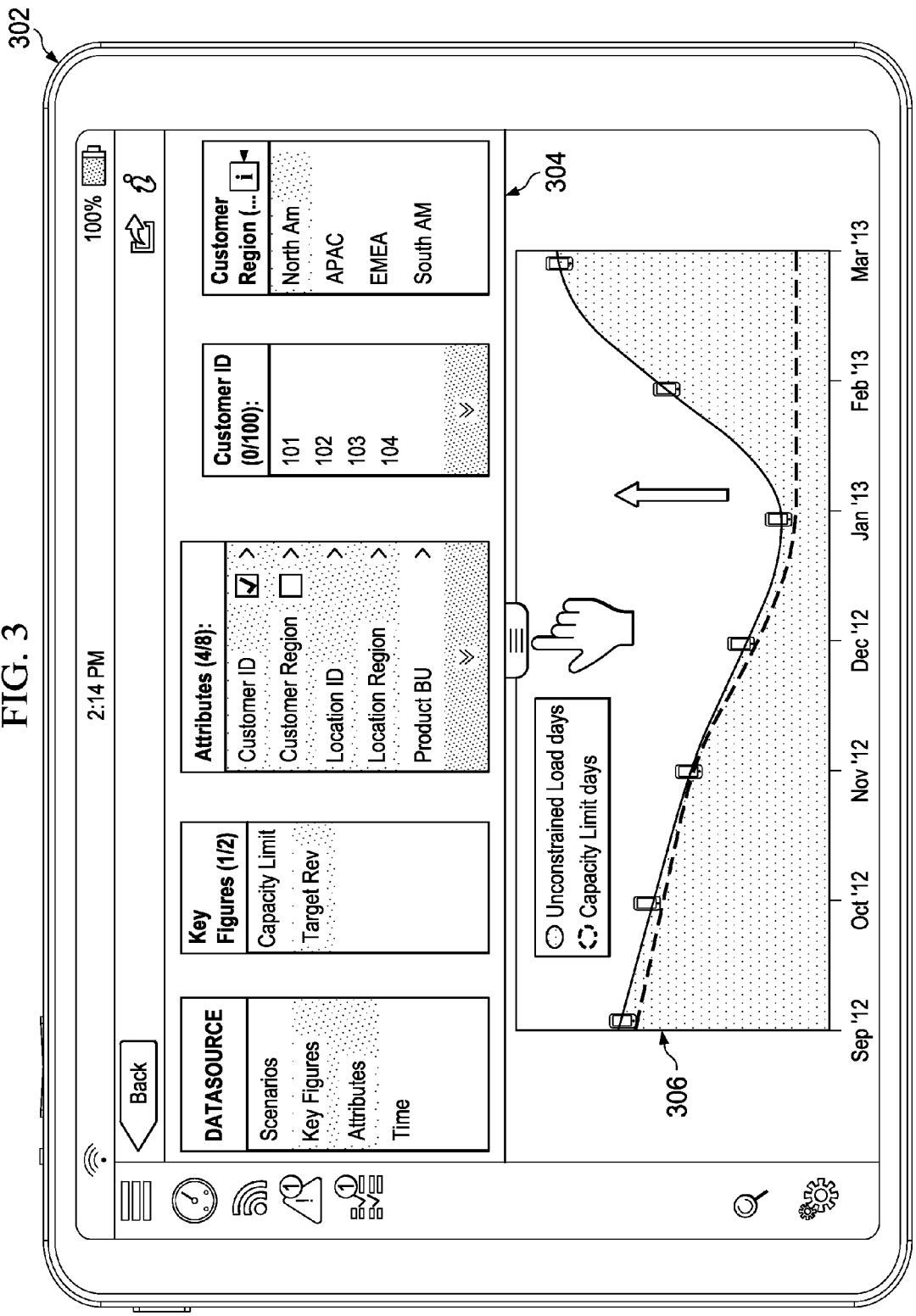
FIG. 3 is an example graphical user interface for display of a graphical representation of data by a mobile computing device.

FIG. 3 illustrates a mobile computing device 302 (e.g., smartphone, tablet, laptop, PDA, or other mobile device) that provides for display a graphical representation 306 and a tab menu 304. The graphical representation 306 is similar to any of the graphical representations 246, 256, 268, mentioned above. In some examples, the tab menu 304 is a pull-down menu. That is, in response to user input, e.g., a "sliding" motion, the tab menu 304 is exposed. The tab menu 304 can include the selection menu 202.

Figure 4:
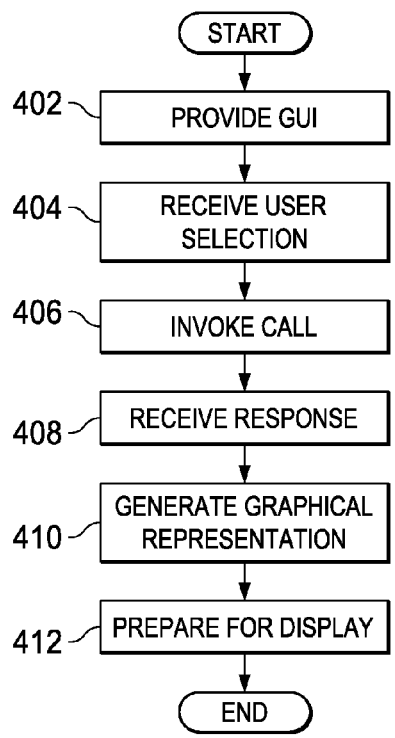
FIGS. 4-7 are flowcharts of example methods of generating graphical representations of data.

FIG. 4 is a flow chart that illustrates a method 400 for generating graphical representations of data. For clarity of presentation, the description that follows generally describes method 400 in the context of FIGS. 1 and 2B-2D. For example, as illustrated, particular steps of the method 400 may be performed on or at an enterprise system, cloud-based system, and/or on-demand system, while other particular steps may be performed on or at a client system or on-premise system. However, method 400 may be performed, for example, by any other suitable system, environment, software, and hardware, or a combination of systems, environments, software, and hardware as appropriate.

In step 402, a graphical user interface (GUI) is provided to a user. The GUI comprises multiple selectable attribute names, each attribute name including a metric that is associated with a portion of data. For example, the GUI 200 is provided to the user, the GUI 200 including the selectable attribute names interface element 232 that includes multiple attribute names.

In step 404, a user selection of a first attribute name of the selectable attribute names is received. For example, the user can select one or more of the attribute names from the selectable attribute names interface element 232, e.g., the customer ID attribute name 234.

In step 406, in response to receiving the user selection of the first attribute name, a call is invoked to a back-end server. The back-end server includes a database. The database stores sets of attribute values, each set of attribute values associated with one of the selectable attribute names. For example, in response to receiving the user selection of the customer ID attribute name 234, e.g., received by the client computing system 140, a call is invoked to a back-end server, e.g., the enterprise server computing system 102, that comprises a database, e.g., the memory 107 and/or the repository 128.

In some implementations, in response to receiving the user selection of the first attribute name, the key figures of the attribute values are grouped based on the user-selected first attribute name. For example, the user can select one of the attribute names of the attribute names interface element 232. That is, when the selection box 242 is selected, the key figures of the attribute values associated with the customer ID attribute name 234 are grouped by the customer ID attribute name 234.

In step 408, a response to the invoked call is received from a back-end server. The response includes a particular set of attribute values that is associated with the user-selected first attribute name. For example, a response from the back-end server, e.g., the enterprise server computing system 102, to the invoked call is received, e.g., by the client computing system 140. The response includes a particular set of attribute values that is associated with the user-selected attribute name, e.g., the customer ID attribute name 234.

In some implementations, the response includes only the particular set of attribute values that is associated with the user-selected first attribute name. For example, the response includes only the particular set of attribute values that is associated with the user-selected attribute name, e.g., the customer ID attribute name 234. That is, the response does not include attribute values associated with unselected attribute names, or other data associated with the unselected attribute names.

In step 410, the graphical representation of a relationship between the received attribute values associated with the user-selected first attribute name and a key figure of the attribute values is generated. The key figure includes a statistical value associated with each of the received attribute values. For example, the graphical representation 246 can be generated to illustrate the relationship between the subset of the attribute values associated with the selected attribute name, e.g., the attribute values 240a, 240b, and the key figure associated with the subset of the attribute values, e.g., the attribute values 240a, 240b.

In some implementations, the graphical representation is chart, e.g., a bar chart. For example, the graphical representation 246 is a chart, e.g., a vertical or a horizontal bar chart. In some implementations, the x-axis of the bar chart is associated with the received attribute values and the y-axis of the bar chart is associated with the key figure. For example, the x-axis of the graphical representation 246 is associated with the attribute values 240a, 240b, and the y-axis of the graphical representation 246 is associated with the target revenue key figure 238.

In step 412, the graphical representation is prepared for display on the graphical user interface. For example, the graphical representations 246 is prepared, e.g., by the client computing system 140, for display on the GUI, e.g. the GUI 142.

Figure 5:
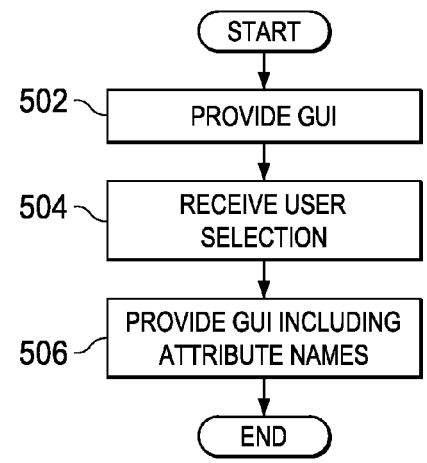

FIG. 5 is a flow chart that illustrates a method 500 for generating graphical representations of data. For clarity of presentation, the description that follows generally describes method 500 in the context of FIGS. 1 and 2A-2B. For example, as illustrated, particular steps of the method 500 may be performed on or at an enterprise system, cloud-based system, and/or on-demand system, while other particular steps may be performed on or at a client system or on-premise system. However, method 500 may be performed, for example, by any other suitable system, environment, software, and hardware, or a combination of systems, environments, software, and hardware as appropriate.

In step 502, the graphical user interface is provided to the user that further includes selectable data sources, the selectable data sources including an attribute data source. For example, the GUI 200 is provided to the user, the GUI 200 including selectable data source interface element 208, including the attribute data source 230.

In step 504, a user selection is received of the attribute data source. For example, the user can select one or more of the data sources from the data source interface element 208, e.g., the key figures data source 222 and the attribute data source 230.

In step 506, in response to receiving the user selection of the attribute data source, providing, to the user, the graphical user interface that comprises the plurality of selectable attribute names. For example, the GUI 200 is provided to the user, the GUI 200 including selectable attribute names interface element 232.

Figure 6:
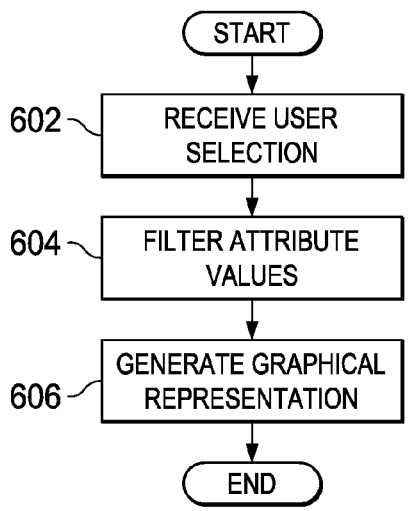

FIG. 6 is a flow chart that illustrates a method 600 for generating graphical representations of data. For clarity of presentation, the description that follows generally describes method 600 in the context of FIGS. 1 and 2D-2E. For example, as illustrated, particular steps of the method 600 may be performed on or at an enterprise system, cloud-based system, and/or on-demand system, while other particular steps may be performed on or at a client system or on-premise system. However, method 600 may be performed, for example, by any other suitable system, environment, software, and hardware, or a combination of systems, environments, software, and hardware as appropriate.

In step 602, a user selection of one or more of the received attribute values is received. For example, the user can select or more of the received attribute values from the customer ID interface element 236, e.g., the attribute values 240a, 240b.

In step 604, the received attribute values are filtered to provide a subset of attribute values, the subset of attribute values including the selected attribute values. For example, in response to selecting the attribute values 240a, 240b, the received attribute values associated with the customer ID attribute name 234 are filtered to provide a subset of attribute values.

In step 606, the graphical representation of the relationship between the subset of attribute values and the key figure of the subset of attribute values is generated. For example, the graphical representation 246 can be generated to illustrate the relationship between the subset of the attribute values associated with the selected attribute name, e.g., the attribute values 240a, 240b, and the key figure associated with the subset of the attribute values, e.g., the attribute values 240a, 240b.

Figure 7:
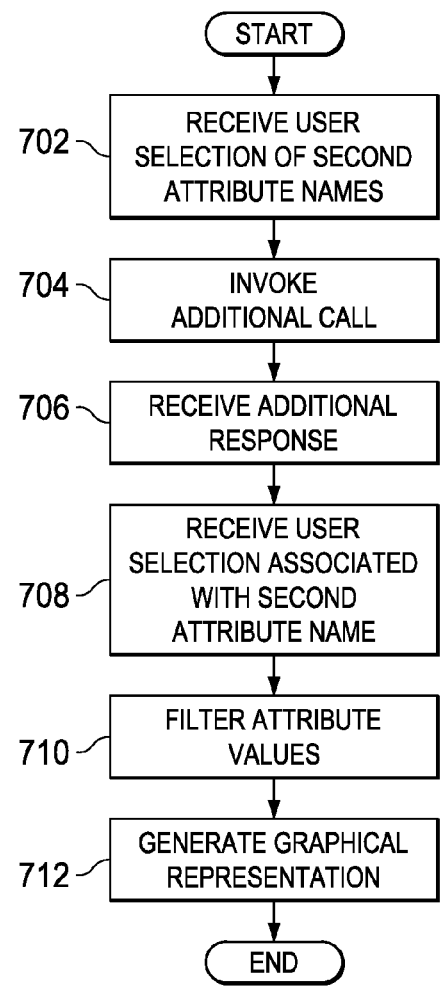

FIG. 7 is a flow chart that illustrates a method 700 for generating graphical representations of data. For clarity of presentation, the description that follows generally describes method 700 in the context of FIGS. 1 and 2E. For example, as illustrated, particular steps of the method 700 may be performed on or at an enterprise system, cloud-based system, and/or on-demand system, while other particular steps may be performed on or at a client system or on-premise system. However, method 700 may be performed, for example, by any other suitable system, environment, software, and hardware, or a combination of systems, environments, software, and hardware as appropriate.

In step 702, a user selection of a second attribute name of the selectable attribute names is received. For example, a user selection is received of the customer region attribute name 248 of the selectable data sources interface element 232.

In step 704, in response to receiving the user selection of the second attribute name, an additional call to the back-end server is invoked. For example, in response to receiving the user selection of the customer region attribute name 248, e.g., received by the client computing system 140, an additional call is invoked to a back-end server, e.g., the enterprise server computing system 102.

In step 706, an additional response to the additional invoked call is received from the back-end server. The additional response includes only a particular set of attribute values that is associated with the user-selected second attribute name. For example, an additional response from the back-end server, e.g., the enterprise server computing system 102, to the additional invoked call is received, e.g., by the client computing system 140.

In step 708, a user selection of a received attribute value that is associated with the user-selected second attribute name is received. For example, the user can select or more of the received attribute values from the customer region interface element 250, e.g., the attribute value 252.

In step 710, the received attribute values that are associated with the user-selected first attribute name are filtered to provide a subset of attribute values that are associated with the user-selected first attribute name. For example, the received attribute values associated with the customer ID attribute name 234 are filtered to provide a subset of attribute values. That is, the attribute values, e.g., the customer IDs 101, 102, 103, . . . , n, are filtered in view of the selected attribute value 252.

In step 712, the graphical representation of the relationship between the subset of the attribute values that are associated with the user-selected first attribute name and the key figure of the subset of the attribute values that are associated with the user-selected first attribute name is generated. For example, the graphical representation 256 illustrates a relationship between the subset of the attribute values associated with the customer ID attribute name 234 that are filtered to in view of the attribute value 252 and a key figure of the attribute values associated with the customer ID attribute name 234 that are filtered to in view of the attribute value 252, e.g., the selected target revenue key figure 238.

In some implementations, the graphical representation is a bar chart, with an x-axis of the bar chart associated with the subset of the attribute values that are associated with the user-selected first attribute and the y-axis of the bar chart associated with the key figure. For example, For example, the x-axis of the graphical representation 256 is associated with the attribute values that are filtered in view of the attribute value 252, and the y-axis of the graphical representation 246 is associated with the target revenue key figure 238.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 4-7), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A method of generating a data-based graphical representation, the method comprising:
   providing, to a user, a graphical user interface that comprises a plurality of selectable attribute names, each attribute name comprising a metric that is associated with a portion of data;
   receiving a user selection that comprises a first attribute name of the plurality of selectable attribute names and a key figure of a plurality of selectable key figures, each of the plurality of selectable key figures comprising a statistical value associated with attribute values of the plurality of selectable attribute names;
   in response to receiving the user selection of the first attribute name, progressively obtaining attribute values from a back-end server, wherein progressively obtaining includes:
      invoking a call to request a particular set of attribute values associated with the user-selected first attribute name from the back-end server that comprises a database, the database storing a plurality of sets of attribute values, each set of attribute values associated with one of the plurality of selectable attribute names; and
      receiving, from the back-end server, a response to the invoked call, the response comprising the particular set of attribute values that is limited to the attribute values associated with the user-selected first attribute name;
   progressively loading the attribute values to generate the graphical representation of a relationship between the particular set of attribute values associated with the user-selected first attribute name and a key figure of the particular set of attribute values, wherein progressively loading includes filtering the particular set of attribute values presented in a first version of the graphical representation to generate a second version of the graphical representation, the filtering according to a selection of at least one of the attribute values through the graphical user interface; and
   preparing the second version of the graphical representation for display on the graphical user interface.

2. The method of claim 1, further comprising:
   displaying, to the user, the graphical user interface that further comprises a plurality of selectable data sources, the selectable data sources comprising an attribute data source;
   receiving a user selection of the attribute data source; and
   in response to receiving the user selection of the attribute data source, providing, to the user, the graphical user interface that comprises the plurality of selectable attribute names.

3. The method of claim 1, wherein the graphical representation comprises a bar chart, with an x-axis of the bar chart associated with the received attribute values and the y-axis of the bar chart associated with the key figure.

4. The method of claim 1, further comprising:
   receiving a user selection of one or more of the received attribute values;
   filtering the received attribute values to provide a subset of attribute values, the subset of attribute values comprising the selected attribute values; and
   generating the graphical representation of the relationship between the subset of attribute values and the key figure of the subset of attribute values.

5. The method of claim 1, further comprising:
   in response to receiving the user selection of the first attribute name, grouping the key figures of the attribute values based on the user-selected first attribute name.

6. The method of claim 1, further comprising:
   receiving a user selection of a second attribute name of the plurality of selectable attribute names;
   in response to receiving the user selection of the second attribute name, invoking an additional call to the back-end server;
   receiving, from the back-end server, an additional response to the additional invoked call, the additional response comprising only a particular set of attribute values that is associated with the user-selected second attribute name;
   receiving a user selection of a received attribute value that is associated with the user-selected second attribute name;
   filtering the received attribute values that are associated with the user-selected first attribute name to provide a subset of attribute values that are associated with the user-selected first attribute name; and generating the graphical representation of the relationship between the subset of the attribute values that are associated with the user-selected first attribute name and the key figure of the subset of the attribute values that are associated with the user-selected first attribute name.

7. The method of claim 6, wherein the graphical representation is a bar chart, with an x-axis of the bar chart associated with the subset of the attribute values that are associated with the user-selected first attribute and the y-axis of the bar chart associated with the key figure.

8. A non-transitory computer storage medium encoded with a computer program, the program comprising instructions that when executed by one or more computers cause the one or more computers to perform operations comprising:

providing, to a user, a graphical user interface that comprises a plurality of selectable attribute names and a plurality of selectable key figures, each attribute name comprising a metric that is associated with a portion of data and each of the plurality of selectable key figures comprising a statistical value associated with attribute values of the plurality of selectable attribute names;

receiving a user selection that comprises a first attribute name of the plurality of selectable attribute names and a key figure of the plurality of selectable key figures;

in response to receiving the user selection of the first attribute name, progressively obtaining attribute values from a back-end server, wherein progressively obtaining includes:

invoking a call to request a particular set of attribute values associated with the user-selected first attribute name from the back-end server that comprises a database, the database storing a plurality of sets of attribute values, each set of attribute values associated with one of the plurality of selectable attribute names; and receiving, from the back-end server, a response to the invoked call, the response comprising the particular set of attribute values that is limited to the attribute values associated with the user-selected first attribute name;

progressively loading the attribute values to generate the graphical representation of a relationship between the received attribute values associated with the user-selected first attribute name and the key figure of the attribute values, wherein progressively loading includes filtering the particular set of attribute values presented in a first version of the graphical representation to generate a second version of the graphical representation, the filtering according to a selection of at least one of the attribute values through the graphical user interface; and preparing the second version of the graphical representation for display on the graphical user interface.

9. The non-transitory computer-storage medium of claim 8, the operations further comprising:

displaying, to the user, the graphical user interface that further comprises a plurality of selectable data sources, the selectable data sources comprising an attribute data source;

receiving user selection of the attribute data source; and in response to receiving the user selection of the attribute data source, providing, to the user, the graphical user interface that comprises the plurality of selectable attribute names.

10. The non-transitory computer-storage medium of claim 8, wherein the graphical representation comprises a bar chart, with an x-axis of the bar chart associated with the received attribute values and the y-axis of the bar chart associated with the key figure.

11. The non-transitory computer-storage medium of claim 8, the operations further comprising:

receiving a user selection of one or more of the received attribute values;

filtering the received attribute values to provide a subset of attribute values, the subset of attribute values comprising the selected attribute values; and generating the graphical representation of the relationship between the subset of attribute values and the key figure of the subset of attribute values.

12. The non-transitory computer-storage medium of claim 8, the operations further comprising:

in response to receiving the user selection of the first attribute name, grouping the key figures of the attribute values based on the user-selected first attribute name.

13. The non-transitory computer-storage medium of claim 8, the operations further comprising:

receiving a user selection of a second attribute name of the plurality of selectable attribute names;

in response to receiving the user selection of the second attribute name, invoking an additional call to the back-end server;

receiving, from the back-end server, an additional response to the additional invoked call, the additional response comprising only a particular set of attribute values that is associated with the user-selected second attribute name;

receiving a user selection of a received attribute value that is associated with the user-selected second attribute name;

filtering the received attribute values that are associated with the user-selected first attribute name to provide a subset of attribute values that are associated with the user-selected first attribute name; and generating the graphical representation of the relationship between the subset of the attribute values that are associated with the user-selected first attribute name and the key figure of the subset of the attribute values that are associated with the user-selected first attribute name.

14. The non-transitory computer-storage medium of claim 13, wherein the graphical representation is a bar chart, with an x-axis of the bar chart associated with the subset of the attribute values that are associated with the user-selected first attribute and the y-axis of the bar chart associated with the key figure.

15. A system of one or more computers configured to perform operations comprising:

providing, to a user, a graphical user interface that comprises a plurality of selectable attribute names and a plurality of selectable key figures, each attribute name comprising a metric that is associated with a portion of data and each of the plurality of selectable key figures comprising a statistical value associated with attribute values of the plurality of selectable attribute names;

receiving a user selection that comprises a first attribute name of the plurality of selectable attribute names and a key figure of the plurality of selectable key figures;

in response to receiving the user selection of the first attribute name, progressively obtaining attribute values from a back-end server, wherein progressively obtaining includes:
- invoking a call to request a particular set of attribute values associated with the user-selected first attribute name from the back-end server that comprises a database, the database storing a plurality of sets of attribute values, each set of attribute values associated with one of the plurality of selectable attribute names; and
- receiving, from the back-end server, a response to the invoked call, the response comprising the particular set of attribute values that is limited to the attribute values associated with the user-selected first attribute name;

progressively loading the attribute values to generate the graphical representation of a relationship between the received attribute values associated with the user-selected first attribute name and the key figure of the attribute values, wherein progressively loading includes filtering the particular set of attribute values presented in a first version of the graphical representation to generate a second version of the graphical representation, the filtering according to a selection of at least one of the attribute values through the graphical user interface; and preparing the second version of the graphical representation for display on the graphical user interface.

16. The system of claim 15, the operations further comprising:
- receiving a user selection of one or more of the received attribute values;
- filtering the received attribute values to provide a subset of attribute values, the subset of attribute values comprising the selected attribute values; and
- generating the graphical representation of the relationship between the subset of attribute values and the key figure of the subset of attribute values.

17. The system of claim 15, the operations further comprising:
- in response to receiving the user selection of the first attribute name, grouping the key figures of the attribute values based on the user-selected first attribute name.

* * * * *